Oct. 24, 1961  A. VANG  3,005,280
GUIDING OF FISH BY ELECTRICAL IMPULSES
Filed Sept. 18, 1957

INVENTOR.
Alfred Vang.
BY *Peter U. Boeing*
ATTORNEY.

United States Patent Office 3,005,280
Patented Oct. 24, 1961

3,005,280
GUIDING OF FISH BY ELECTRICAL IMPULSES
Alfred Vang, P.O. Box 864, Rancho Santa Fe, Calif., assignor of one-third to Anna Vang, and one-third to Alfred Vang, trustee
Filed Sept. 18, 1957, Ser. No. 684,743
4 Claims. (Cl. 43—4.5)

This invention relates to improvements in the guiding of fish by electrical impulses in a manner generally described in my United States Patent No. 2,808,674, patented October 8, 1957.

While the device or system described in said application has worked well under fixed conditions, it has been found that when surrounding conditions change provision must be made for automatic or semi-automatic changes in the controls.

An object of the present invention is to provide a means for altering the controls of the apparatus described in said application.

The device of my above-mentioned patent operates on the discovered principle that fish, in water, are attracted to the positive electrode when two electrodes oppositely charged are present in the water. The degree of attraction is dependent on several variables, viz. the potential difference between the two electrodes, the size of the fish, the duration of the applied potential and the length of the periodic interval of time between applications of the potential.

The explanation of the attraction of a fish to the anode is not fully shown. Some, familiar with the phenomenon, explain it by saying a fish has polarity but this is little more than a statement, in different words, of a simple fact observed.

The fact that oxygen is liberated at the anode and increases the concentration of oxygen in the water therearound appears as a plausible explanation save for the fact that a small fish has a proportionately higher metabolism than a larger fish and would presumably more readily detect oxygen than a larger fish, and yet, higher potentials are required to affect the smaller fish.

On the other hand, if the effect is due solely to the oxygen seeking action of the fish it can be seen that periodic electrolysis of water is advantageous over continuous application of a source of potential. This is due to the fact that diffusion of oxygen into the water is a relatively slow process and potential requirements for electrolysis rise with an increase in oxygen concentration in the surrounding water. This explanation seems, from my findings, to be not without apparent support despite the fact that the oxygen concentration gradient is almost precipitate in moving away from the anode.

But the more important aspect of the total effect appears to be a change of acidity at or of the gills of the fish. The gills are very susceptible to changes of acidity and a difference of electrical potential over only the length of the fish can affect the gill acidity, so that the fish orients itself to a better gill condition. The duration of the current must therefore not be too long to keep the gill membranes under prolonged unnatural conditions.

The gill acidity at any one time is thus related to current magnitude, duration of current flow, and period between applications of current. The latter two are also related to simple diffusion of ions and gases.

I have found that the salinity of the water greatly affects the electrical action on fish, as does the temperature of the water, to mention only two disturbing influences, though there may be others such as the presence of sea weeds.

In general the current flowing through the water is proportional to the concentration of salts and the like in the water. This holds only so long as polarization effects are not present in quantity. Yet the salts greatly affect gill acidity during and immediately after the passage of current so that current control will to a considerable degree affect the gill acidity, and the nature of the control is, in general, dependent on the type of fish to be affected.

Another object of the invention is therefore to provide a fish orienting system wherein the current passing through the water actuates a feed-back control for a pulse generator for supplying current to the electrodes.

In the accompanying drawing showing, by way of example, several of many possible embodiments of the invention, FIGURE 1 is a schematic representation of the invention as shown in connection with a boat carrying a generator and a single outpost electrode.

Figure 1:
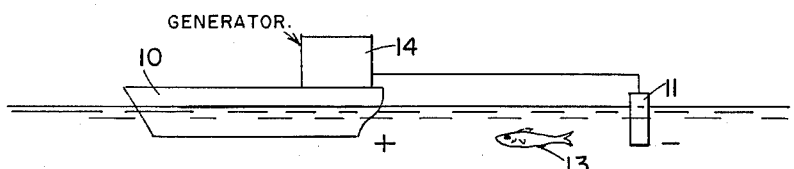
Figure 2:
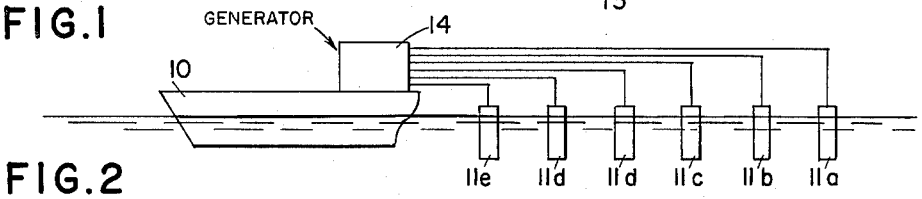
FIGURE 2 is a schematic representation similar to that of FIGURE 1 with a plurality of electrodes.
Figure 3:
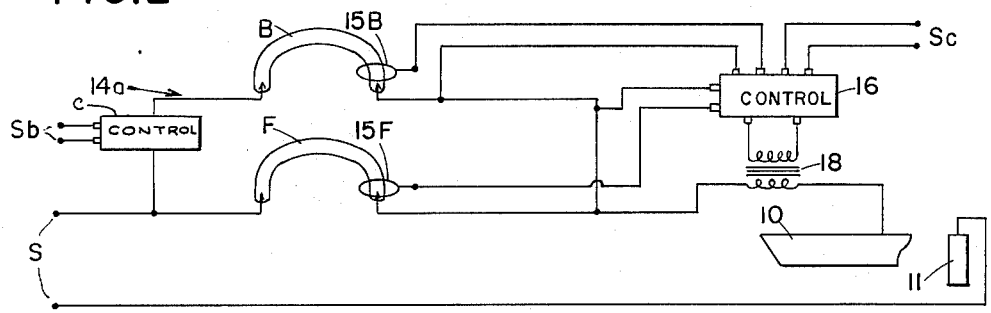
FIGURE 3 is a schematic representation of the current generator for the system.

The invention comprises a fishing boat 10 normally biased to bear a positive charge with respect to an outpost electrode 11 in water 12 which may contain fish 13. The difference in potential between the boat and the electrode 11 is set up by a generator generally designated 14.

As described in my above-mentioned patent, more than one electrode may be used, such as here shown as a plurality of electrodes 11a, 11b, 11c, 11d and 11e. Also as described in said patent the polarity of such a series need not be fixed but there may be period change so as to periodically give a positive charge to an electrode so that there is a series of "ripples" in polarity tending to lure the fish in a given direction. In the present instance the direction would of course be toward the boat.

The electrodes 11a, 11b, 11c, 11d, 11e may also be arranged somewhat arcuately with the center of the arc being substantially at the boat 10.

A form of generator is shown as 14a wherewith the boat and electrode are connected to a source of current S through a "forward" arc tube F ignited by a trigger element 15F such as described in my United States Patent No. 2,287,541 of June 23, 1942. The source S may be D.C. or A.C. depending on the manner of firing of tubes F and B (described below) and the shape of the wave pattern for the action on the fish. If the source be A.C. limitations on the shape of the wave pattern may occur, since once the tube F is rendered conductive, it normally remains so until the voltage drop across the tube reaches the periodic zero value.

If the source S be sustained D.C. some means must be provided to blow out the arc in the tube F. To do this I prefer to apply a source of current or potential Sb across the tube F through a blow-out tube B controlled by a trigger element 15B, and connected in opposition with source S.

The respective triggering elements 15F and 15B may be energized in a known manner at variable time intervals, for example by high voltage current of variable frequency. Such a known device is shown schematically as a control 16 energized primarily by a source of current Sc.

That is to say that the source of current (really little more than a source of high potential) for the trigger electrodes 15B and 15F is supplied by source Sc. Also source Sc furnishes operating power for the control 16 such as power for driving mechanical timing switches, or heating current for filaments of vacuum tubes, bias potentials, plate potentials and the like if the control 16 is more or less completely electronic rather than mechanical.

The control 16 is varied by a regulating current derived from a current transformer 18, the primary 19 of which is serially connected into the load line.

It is contemplated that control 16 can be adjusted or varied so as to fire tube F at any desired time and to fire tube B at any desired time. The times of firing each tube may be relative to the times of firing the other, and if the main source S is alternating current, the firings may be made relative to the frequency of the current from S.

Such controls are well known in the art and are not per se part of the invention.

Figure 4:
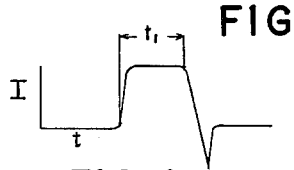
FIGURE 4 and FIGURE 4a are wave patterns of components of current applied to electrodes.
Figures 4A, 5, 6:
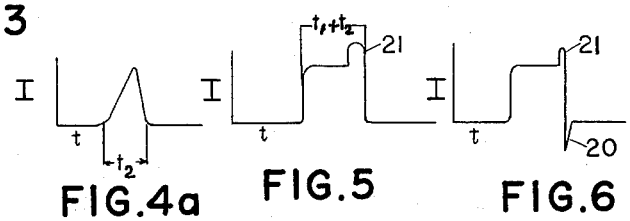
FIGURES 5 and 6 are wave patterns of total current applied to the electrodes.

Reference is made to FIGURES 4 and 4a to understand more clearly the operation of the generator. Assume source S to be D.C. at constant voltage. Tube F is now fired and after a short interval the current builds up and then flows at about a constant rate. After an interval $t_1$ from the time tube F was fired the tube B is fired to give an inverse potential originating from potential source $Sb$ which is preferably D.C. Current through tube F falls rather sharply and in a normal loaded line, which contains inductance of some kind, such as the transformer 18, the current usually reverses as shown by the low dip in FIGURE 4. Meanwhile, current flowing through tube B for an interval $t_2$ is added to the loaded line.

Source $Sb$ is of low power (current). A control C such as a storage device, for example a condenser, may be trickle charged by source $Sb$ so that the current through tube B quickly diminishes due to exhaustion of the effective supply from $Sb$ and an attendant drop in potential across tube B. Some current does flow however through tube B for a period $t_2$ as shown in FIGURE 4a. The net of currents in tubes F and B which finds its way into the loaded line over the period $t_1+t_2$ is shown approximately in FIGURE 5.

Figure 7:
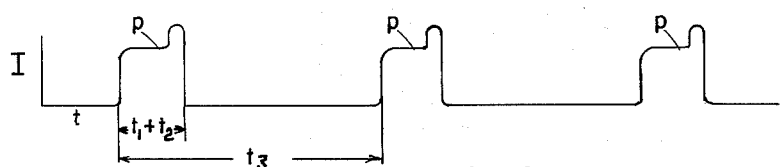
FIGURE 7 is a series of wave patterns of current applied to the electrodes.

Impulses of current having a wave from such as shown in FIGURE 5 (or its slight variant FIGURE 6) can be repeated at intervals $t_3$ as shown in FIGURE 7.

Having thus described the fundamentals of operation of the generator 14, it will be obvious that the control 16 thus far might be merely high speed switches operated by regularly moving cams to control ignition current to the trigger or igniter electrodes 15F and 15B. In practice, current (not much more than a static potential) is usually supplied to the triggers via vacuum triodes wherein the grids receive a potential at beats from the oscillating currents.

Having thus described a simple form of operation of the generator other modes of operation can be even more readily understood.

As mentioned the source S may be A.C. Consequently the current can be varied in accordance with the phase relation of the A.C. source and the ignition of tube F. Assuming the current of S to follow a smooth sine wave W as in FIGURE 8, early firing of tube F at $a$ in the first quarter of the cycle will yield a lower initial amperage than later firing in the same quarter as at $c$ in FIGURE 8a. Blow out in FIGURE 8 occurs at $b$ in FIGURE 8 and at $d$ in FIGURE 8a. Thus low currents can be clipped off between $a$ and $b$ and higher currents between $c$ and $d$. It is often desirable that the total current become negative (or opposite polarity) for a slight length of time as at 20 (FIGURE 6) to remove gas bubbles and reduce polarization.

This negative current usually occurs without special provision due to the inductance of the system. It is difficult to reduce a current abruptly to exactly zero.

Since a prime object of the invention is to compensate for various changes in conductivity of the water and still be able to affect fish the total current as shown in FIGURE 5 is most suitable. A sudden rise in current as at 21 near the end of the current cycle appears to appreciably affect fish in that while large sustained currents are harmful to certain fish (and uneconomical) the final spurt 21 of current is in many instances a determining influence. It is not known why this should be but is thought to make a drastic "impression" while the fish is under a biasing influence. The short reversal at 20 does not neutralize the effect.

Generally the fish-affecting current is in the nature of pulses $p$ of duration $t_1+t_2$ where $t_1$ is the period of flow through tube F and $t_2$ that through tube B. The period between pulse initiations is $t_3$. As stated in my patent these are variables dependent on species of fish as well as their size.

Figure 8:
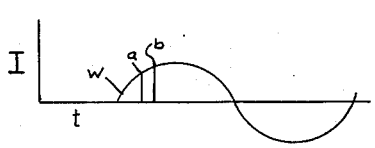
FIGURES 8 and 8a show how the current for a component may be varied in degree and with respect to time.
Figure 8A:
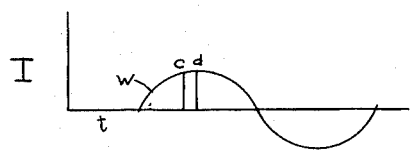

The control 16 may be used to clip off portions of current from the alternating source at different phases in the cycle as shown in FIGURES 8 and 8a. Thus, if the clipping is completed before maximum current is reached, as in FIGURE 8, the current is less than when taken from the zenith phases.

The current transformer may actuate the control 16 to effect phase shifting so that for given values of $t_1$, $t_2$, and $t_3$ the current to the waters remains substantially constant merely by a phase shift in ignition times.

Thus with a phase shifter in the control 16 responsive to the output of the transformer 18, a shifting of ignition times as from in FIGURE 8 to FIGURE 8a is produced and the current is increased. Obviously phase shifting for this purpose must take place within a quarter of a cycle for the cycle of source S.

The source $Sb$ may be in the nature of condenser with inductance interconnected to limit blow-out time or a simple square wave generator as well as a square wave generator with width control.

These sources are well known to the art and need not be described, but are mentioned to indicate concepts of the scope of the invention. The current is applied to the fishing waters as magna quanta of energy.

In general, it is much easier to manipulate controls and determine whether the desired results are obtained than to attempt to predetermine the results since so many unknown variables exist in fish, and in ocean waters from time to time. However the following may be considered typical.

The invention claimed is:

1. In the art of fishing, a method for inducing fish to move in given direction comprising applying a source of current to two electrodes in water containing the fish at a substantially constant rate and maintaining said rate for a given length of time and then suddenly increasing the current to a substantially constant value and then suddenly decreasing the current.

2. In a method as claimed in claim 1, and after suddenly decreasing the current, reversing the current for a short length of time to prevent gas polarization and to relieve the fish from strains imposed thereon.

3. In the art of fishing according to claim 1 and wherein the conductivity of the water varies, the auxiliary step of sensing the flow of current between the electrodes and varying the effective potential of said source in accordance with the flow to insure said constant flow.

4. In the art of fishing as claimed as claim 3, said source being of undulating current and varying of the effective potential being by clipping off increments of current in timed relationship to the undulation.

UNITED STATES PATENTS

References Cited in the file of this patent

| 1,464,623 | Lybeck | Aug. 14, 1923 |
| 1,838,981 | Anderson | Dec. 29, 1931 |
| 2,163,282 | Hovden | June 20, 1939 |
| 2,792,659 | Kreutzer | May 21, 1957 |

OTHER REFERENCES

Electronics Dictionary by Cooke and Markus, page 207, published 1945 by McGraw-Hill Book Co. Inc., New York, N.Y.